United States Patent [15] 3,636,928
Sumner et al. [45] Jan. 25, 1972

[54] AUGER CONSTRUCTION

[72] Inventors: Elton Sumner, 452 Brookwood Drive, Athens, Ga. 30601; Aaron W. Adams, Jr., Douglas, Ga. 31533

[22] Filed: Sept. 17, 1970

[21] Appl. No.: 72,971

[52] U.S. Cl. .................................. 119/52, 198/64, 198/2 B
[51] Int. Cl. ......................................... A01k 5/00, A01k 39/00
[58] Field of Search ............... 119/51, 52, 51.11; 198/64, 198/213; 222/282

[56] References Cited

UNITED STATES PATENTS

| | | | |
|---|---|---|---|
| 2,652,954 | 9/1953 | Nowak, Jr. | 222/282 |
| 3,077,972 | 2/1963 | Mitchell | 198/64 |
| 3,125,989 | 3/1964 | Cordis | 119/52 |
| 3,381,801 | 5/1968 | Rastoin | 198/213 |
| 3,476,087 | 11/1969 | Scott et al. | 119/52 |
| 3,566,843 | 3/1971 | Van Huis | 119/53 |

Primary Examiner—Aldrich F. Medbery
Attorney—B. J. Powell

[57] ABSTRACT

An auger construction including an elongated flexible resilient open-cored spring-type auger with a core member within the open core of the auger and substantially filling this core yet movable with respect to at least a plurality of flights of the auger so that, as the auger flights move with respect to each other while the auger is conveying particulate matter such as poultry feed, the flights and core member will move relative to each other. The core member may be substantially rigid for a straight auger or flexible for a curved auger and may be forcibly moved or held stationary within the auger. The feeder system described includes a feed supply means with means for regulating the amount of feed carried by the auger and return mechanism is provided for returning the excess feed discharged from the auger back to the supply means for recycling this feed.

18 Claims, 7 Drawing Figures

PATENTED JAN 25 1972
3,636,928
SHEET 2 OF 3
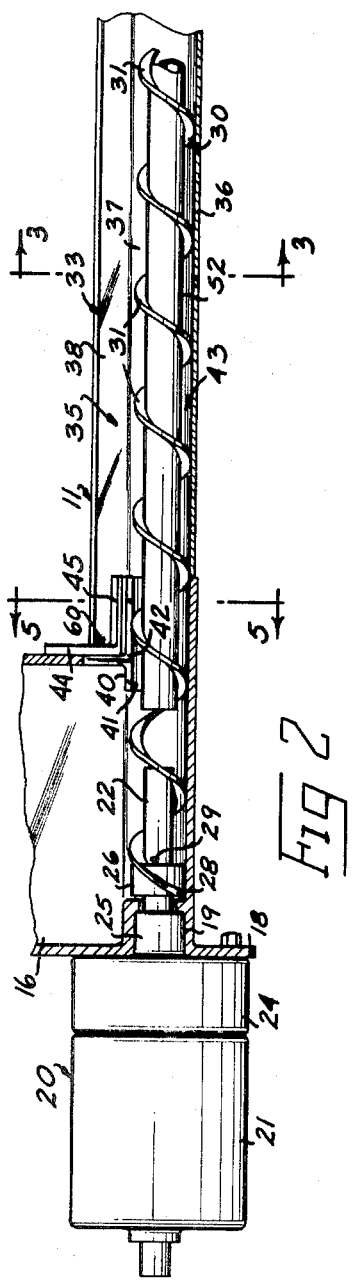
Fig 2
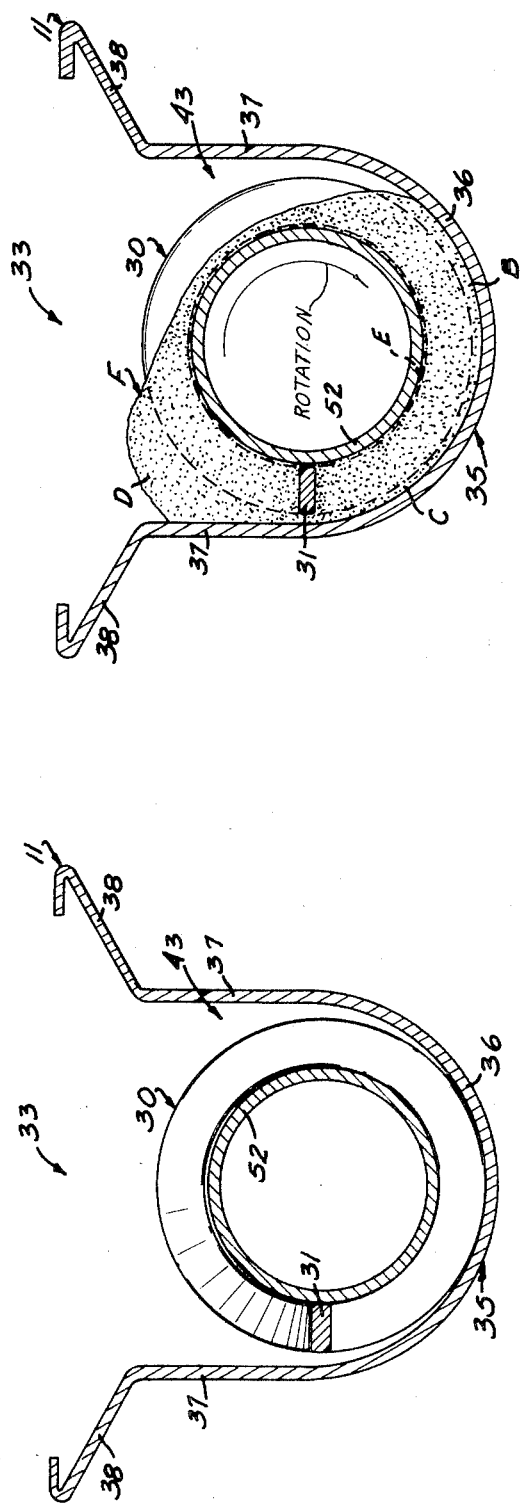
Fig 4
Fig 3

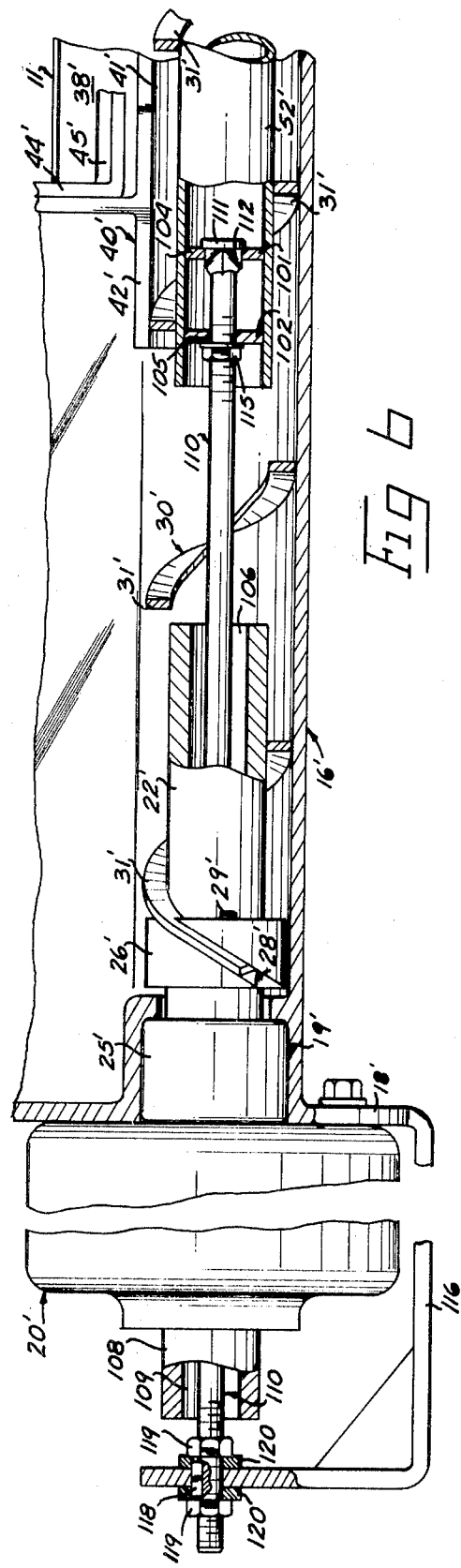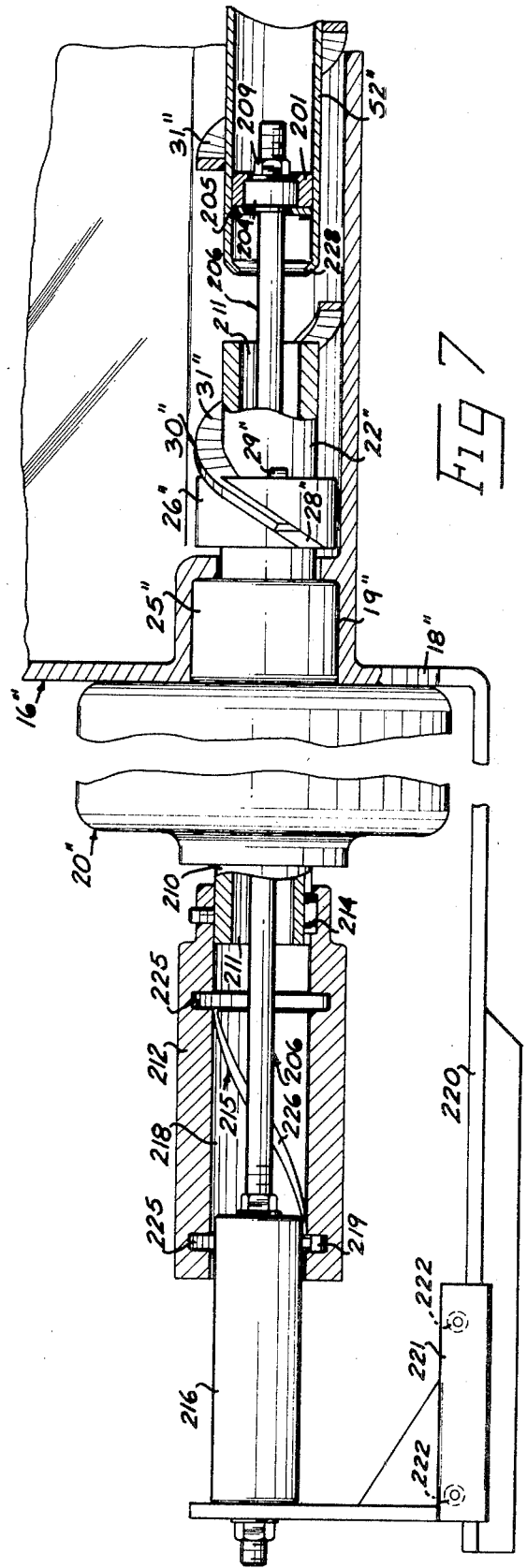

AUGER CONSTRUCTION

BACKGROUND OF THE INVENTION

There are presently two general types of augers used for transporting particulate material such as poultry feed. One type is the solid core auger and the other type is the open core spring-type auger. While the solid core auger is able to transport the material in an open trough, it is expensive to make since the auger flights must be attached to the core by means such as welding, does not lend itself to use as a flexible auger, requires shock-absorbing couplings interspersed therein for long runs, and causes material buildup along its length so that the auger will dislodge itself from the trough. The open core spring-type auger is flexible and can be manufactured economically, but must be used in a tube which confines the auger in order to operate. In the poultry-feeding industry, it is highly desirable that the feed never leave the conveyor since the feed cannot be recaptured once it leaves and frequently becomes stale. Since the open-cored auger must be confined in order to prevent undesirable feed carrying and distribution characteristics, it is impractical to use this auger unless the feed leaves the auger before being consumed. Since poultry frequently deposit water and other liquids as well as foreign material in the feed while eating and since condensation also occurs, this causes undesirable feed carrying and distribution characteristics thereof and causes feed to build up under the auger so as to eventually lift the auger out of the trough.

SUMMARY OF THE INVENTION

These and other problems and disadvantages of the prior art are overcome by the invention disclosed herein in that an auger construction is provided which can transport particulate material in an open trough, yet is flexible and can be economically manufactured. Moreover, the invention is self-cleaning to prevent material buildup on the flights of the auger and the core member carried in the auger, and permits a feeding system to be made in which the feed does not have to leave the auger until it is consumed by the poultry.

The apparatus of the invention includes a U-shaped open top trough with an open-cored spring-type auger carried in the trough and freely rotatable therein with a nonrestricting core freely receivable in the open core positioned therein. A motor is appropriately connected to the auger for driving same. The core may be flexible if it is desired that the auger is to be curved, or rigid if the auger is to be straight. At least a plurality of the flights of the auger are unattached to the core so that relative movement between the auger flights and the core can take place to prevent material buildup along the flights of the auger. Generally, the core is not attached to the auger and is allowed to be free floating to effect optimum cleaning while at the same time keeping the manufacturing cost to a minimum. Means may also be provided for preventing rotation of the core member while the auger is rotating and for reciprocating the core member within the auger.

These and other features and advantages of the invention will become more apparent upon consideration of the following specification and accompanying drawings wherein like characters of reference designate corresponding parts throughout the several views and wherein:

BRIEF DESCRIPTION OF THE DRAWINGS

FIG. 2 is an enlarged longitudinal cross-sectional view of the feeding system of FIG. 1 showing the auger construction;

FIG. 3 is an enlarged transverse cross-sectional view taken along line 3—3 in FIG. 2;

FIG. 4 is a view similar to FIG. 3 showing the invention in use transporting material;

FIG. 5 is a cross-sectional view taken along line 5—5 in FIG. 2;

FIG. 6 is a partial view similar to FIG. 2 showing a stationary core auger; and

FIG. 7 is a partial view similar to FIG. 2 showing a reciprocating core auger.

Figure 1:
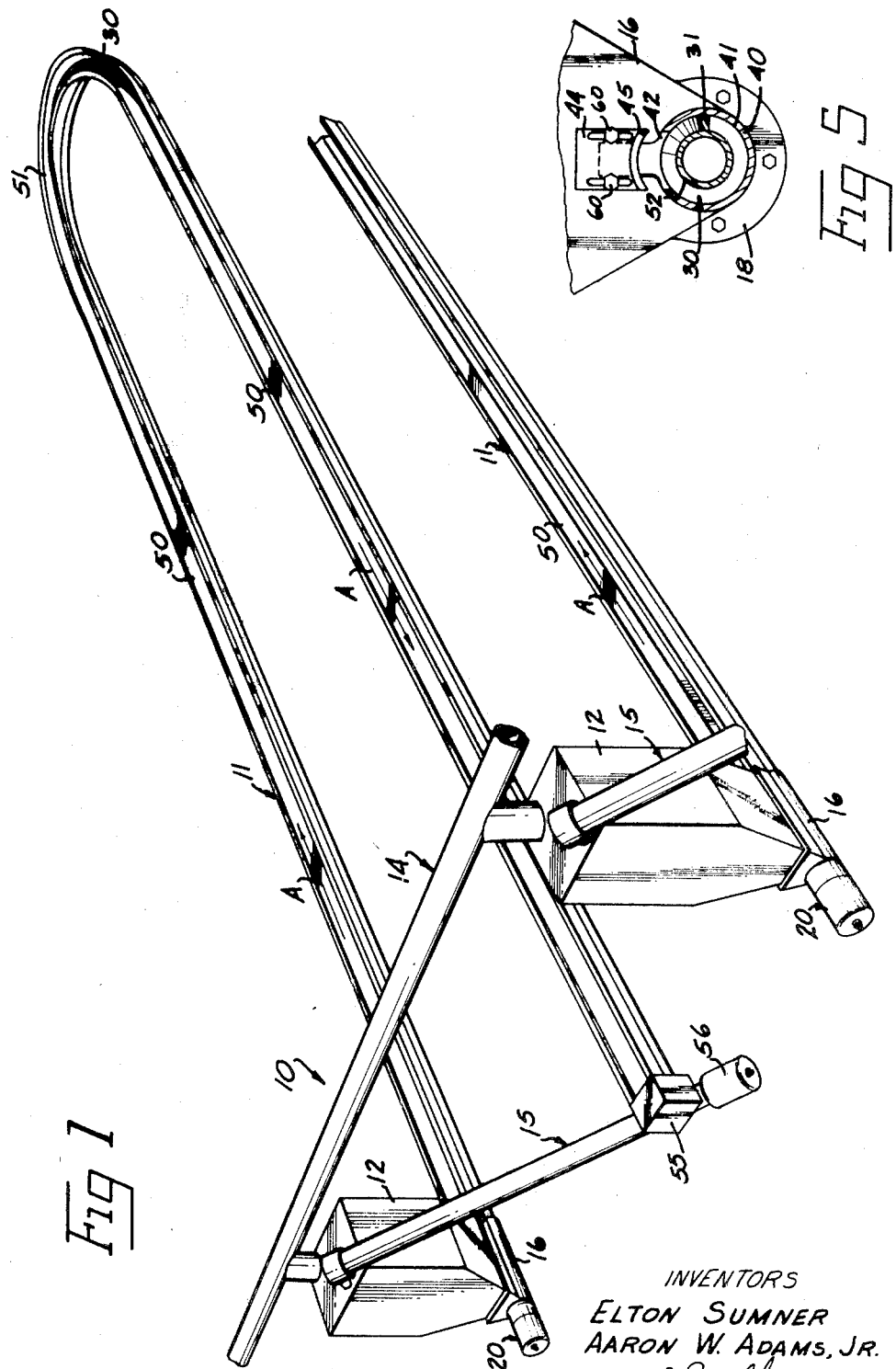
FIG. 1 is a perspective view illustrating the invention embodied in a poultry-feeding system.

These figures and the following detailed description disclose specific embodiments of the invention, however, it is to be understood that the invention concept is not limited thereto since it may be embodied in other forms.

DETAILED DESCRIPTION OF ILLUSTRATIVE EMBODIMENTS

Referring to the figures, it will be seen that the invention is embodied in a poultry-feeding system 10, however, it may be embodied in any conveyor system for transporting small particulate matter. The system 10 is adapted to be installed in a poultry house (not shown) and includes a plurality of feeder-conveyors 11 which extend through the house for the poultry therein to be supplied with feed. Each feeder-conveyor 11 is provided with a supply hopper 12 and these supply hoppers 12 are in turn supplied with feed from an outside receptacle (not shown) through a supply conveyor 14. Each feeder-conveyor 11 may also be provided with a return conveyor 15 for returning the excess feed at the end of the feeder-conveyors 11 back to the supply hopper 12 for recycling of the feed.

As is best seen in FIGS. 1, 2, and 5, each feeder-conveyor 11 includes a receptacle 16 which fits under the open lower end of the feed hoppers 12 and serves as a means for introducing the feed from the hopper 12 into the feeder-conveyor 11. Each receptacle 16 is provided with a motor mount 18 as seen in FIG. 2 and a bearing support 19 for the drive of the auger 30. The auger drive unit 20 is carried by the motor mount 18 and includes a motor 21 connected to an auger drive shaft 22 through a transmission 24. The drive shaft 22 is mounted in a bearing 25 carried in the bearing support 19 and is provided with a collar 26 with a slot 28 and setscrew 29 for locking the auger 30 onto the drive shaft 22.

The auger 30 is an elongated one-piece, open core, flexible and resilient screw member which is formed from a resilient wire having a generally rectangular cross section and which is generally referred to in the industry as a spring-type auger. The strength of auger 30 is such that it will not collapse when subjected to a sufficient force to carry the feed. The auger 30 is made up of a plurality of helical flights 31, each forming a complete circle integral with each other and defining an open core 27 therethrough. The end flight of auger 30 is inserted into slot 28 and setscrew 29 tightened to attach auger 30 on drive shaft 22.

The auger 30 is supported in a U-shaped trough 35 with a semicircular bottom section 36 and a pair of upstanding walls 37 defining an auger recess 43 there between. A pair of diverging flanges 38 are provided along the top edges of walls 37. The end of trough 35 is attached to the discharge end of the receptacle 16.

The discharge end of receptacle 16 is provided with a tubular section 40 as best seen in FIGS. 2 and 5. The tubular section 40 extends through the discharge end of receptacle 16 and defines a passage 41 therethrough which the auger 30 rotatable extends. An opening 42 is provided along the upper portion of tubular section 40 and in the receptacle 16. The opening 42 can be selectively closed by a gate 44 having an arcuate flange 45 which conforms to the curvature of the tubular section 40 to form a complete circle with the tubular section 40 when the gate is closed.

The trough 35 shown in FIG. 1 has a pair of straight sections 50 with a curved section 51 joining the sections 50 at one end. Since the auger 30 is flexible, a single auger 30 may be used for the entire length of trough 35.

A nonrestricting core member 52 freely receivable in the open core 27 of auger 30 is positioned therein as shown in FIGS. 2–4. Member 52 is illustrated as tubular but may also be solid. For use in the auger 30 shown in FIG. 1, at least that portion of core member 52 at the curved section 51 of trough 35 must be flexible in order for the auger 30 to lie in section 51. For straight runs of the auger 30, the core member 52 may be either rigid or flexible. The rigid sections of core member 52 will usually be made of metal while the flexible sections will usually be a synthetic material such as a polyvinyl chloride. The core member 52 almost fills the open core 27 or auger 30 yet will allow relative movement between the flights 31 and the core member. Therefore, it will be seen that the core member 52 does not add any significant strength to the auger 30 but simply acts to fill the void of the open core.

During actual operation in which auger 30 is transporting material, the flights 31 are constantly being flexed back and forth with respect to each other. Since the core member 52 is not attached to at least a plurality of these flights 31, the flights are constantly moving with respect to the core member 52. As moisture tends to cause the material being transported to adhere to the flights 31 and core member 52, the constant movement of the core member relative to the flights dislodges the caked material and is constantly cleaning the auger and core member. Thus, it will be seen that better cleaning action will take place if the core member is not attached to the flights of the auger 30 at all, but is allowed to be free floating. If this is the case, the core member 52 will rotate with the auger 30 but probably at a different rotational speed. Moreover, the core member 52 will also probably slowly shift longitudinally back and forth within the core 27 of auger 30 as the auger rotates. All of this movement serves to clean any caked material from the flights 31 and core member 52.

Referring to FIG. 6, a second embodiment of the invention is shown in which the core member is fixed against longitudinal and rotational movement. FIG. 6 is a view similar to FIG. 2 with the auger drive unit having parts thereof broken away and foreshortened for the sake of space. The second embodiment of the invention includes a receptacle 16' similar to receptacle 16 with the corresponding parts of the receptacle 16', auger 30' and core member 52' being referenced by primes of the numbers applied to the first embodiment of the invention.

In this embodiment of the invention, the core member 52' includes a pair of support disks 101 and 102 positioned inside the member 52' and attached thereto by means such as welding. Disk 101 defines a central aperture 104 therethrough having a square configuration and disk 102 defines a central aperture 105 therethrough. The drive shaft 22' is hollow defining a central passage 106 therethrough. The shaft 108 of drive unit 20' is also hollow with a central passage 109 therethrough.

A stay pin 110 is positioned in the disks 101 and 102 of the core member 52' and extends through the passages 106 and 109 to extend out beyond drive unit 20'. That end of pin 110 at disk 101 has a head 111 and a shoulder 112 adjacent the head 111 with a square configuration to fit in aperture 104 so as to prevent the rotational movement of core member 52' with respect to pin 110. The pin 110 is also threaded at 114 in the area adjacent aperture 105 when the head 111 is in place against disk 101 so that a nut 115 can be threaded onto pin 110 to lock the pin in position on the core member 52'. It is to be understood, however, that other means may be used to fix pin 110 with respect to core member 52'.

The length of stay pin 110 is sufficient to extend through passages 106 and 109 without the end of core member 52' interfering with the end of drive shaft 22'. The passages 106 and 108 are also large enough to permit pin 110 to pass therethrough without engaging shafts 22' or 108. A positioning bracket 116 extends from the lower edge of motor mount 18' down under drive unit 20' for connection to the end of pin 110 extending from drive unit 20'. The upper end of bracket 116 is keyed to pin 110 through key 118 to prevent pin 110 and thus core member 52' from turning with respect to bracket 116. Nuts 119 threaded onto the end of pin 110 and spacers 120 on opposite sides of bracket 116 locate the pin 110 on bracket 116.

When this embodiment of the invention is used, the pin 110 holds the core member 52' stationary to prevent it from turning with the auger 30'. This insures that the auger 30' will be constantly cleaning the core member 52' and that the caked material on the auger 30' will be quickly dislodged therefrom.

Referring to FIG. 7, a third embodiment of the invention is shown in which the core member is positively reciprocated longitudinally within the open core of the auger as the auger is rotated. FIG. 7 is a view similar to FIG. 2 with the auger drive unit having parts thereof broken away and foreshortened for the sake of space. The third embodiment of the invention includes a receptacle 16" similar to receptacle 16 of the first embodiment of the invention with the corresponding parts of the receptacle 16", auger 30" and core member 52" being referenced by double primes of the numbers applied to the first embodiment of the invention.

In this embodiment of the invention core member 52" includes an annular bearing housing 201 defining a centrally located bearing receiving recess 202 therethrough. A bearing 204 is clamped in recess 202 by annular flange 205 attached to housing 201. The inner race of bearing 204 is attached to one end of a reciprocating rod 206 between flange 208 about rod 206 and a nut 209 threadedly received on the end of rod 206 extending through bearing 204. Drive shaft 22" and the shaft 210 of drive unit 20" are both hollow to define a common passage 211 through which rod 206 extends from core member 52".

The rear end of shaft 210 carries an annular cam member 212 which is keyed to shaft 210 for rotation therewith by key 214. Cam member 212 defines a reciprocating cam race arrangement 215 therein which will drive rod 206. The rearmost extending end of rod 206 is attached to a cylindrical guide block 216 which is freely receivable within the passage 218 through cam member 212. A cam follower 219 is provided at one end of guide block 216 which rides in cam race arrangement 215.

A guide bed 220 extends from the motor mount 18" down under drive unit 20" and under guide block 216 along a path parallel to rod 206. A saddle 221 attached to the rear end of rod 206 and guide block 216 is carried by bed 220 so as to be supported for movement longitudinally with respect to the centerline of auger 30". Saddle 221 is provided with rolls 222 to allow free movement back and forth along the bed 220.

As drive unit 20" rotates shafts 22", 210 and auger 30", the cam member 212 is rotated. The cam race arrangement 215 includes a circular race section 225 at each end thereof joined by two helical race sections 226 (one of which is shown). The arrangement 215 is conventional and will cause cam follower 219 to move along one helical race section 226 toward unit 20", then along the circular race section 225 to the next helical race section 226, and then along the other circular race section to the first helical race section. Thus, it will be seen that cam member 212 causes the core member 52" to be positively reciprocated within the auger 30".

The length of rod 206 is such that the near end of core member 52" will not interfere with the operation of shaft 22". The near end of member 52" may also be tapered as at 228 to facilitate reciprocal movement of core member 52" within auger 30". Bearing 204 allows core member 52" to freely rotate with respect to rod 206 as the same is reciprocated and as auger 30" rotates.

Referring back to FIG. 1, it will be seen that the return conveyor 15 is connected to the end of the return run of conveyor 11 through its catch hopper 55. Motor 56 then drives the conveyor 15 to lift the excess material received from conveyor 11 back to hopper 12 for recycling through feeder-conveyor 11. It is also to be understood that an appropriate transmission may be attached to the distal end of auger 30 for driving conveyor 15 from the drive unit 20. If only straight runs of feeder-conveyor 11 are used, then a transfer conveyor (not shown) similar to conveyor 15 would connect the distal ends of the feeder-conveyors and a hopper and drive unit would be provided at the distal end of the return feeder-conveyor. It is to be further understood that different types of conveyors 15 and the transfer conveyors may be substituted for those shown.

OPERATION

In operation, it will be seen that the conveyor 14 is operated to supply feed to the hoppers 12. The drive units 20 are operated to rotate auger 30 in the appropriate direction to cause the feed to be moved along the troughs 35 as indicated by arrows. A. The gate 44 is adjusted by fasteners 60 to regulate the amount of feed being transported by auger 30.

Referring particularly to FIG. 3 which illustrates the auger 30 when it is not operating and no feed is in trough 35, it will be seen that auger 30 is resting on the lowermost portion of bottom section 36. As soon as feed F is supplied to the auger 30 and the auger is rotated clockwise as illustrated in FIG. 4, it will be seen that the torque exerted on the auger 30 causes it to move laterally in the trough. The auger will assume a position in which the outer edges of the flights 31 ride on a thin layer B of the feed. The thinnest portion of the layer B will be somewhat in the vicinity of point C. Thus, it will be seen that the auger 30 rides on a cushion of feed so as to virtually eliminate wear between the trough 35 and auger 30.

The core member 52 causes the feed to assume the configuration shown in FIG. 4. This configuration provides a feeding area D adjacent the upper end of the near wall 37 (the left wall in FIG. 4) which is sufficiently deep to allow the poultry to eat from this area yet shallow enough to prevent the poultry from inserting their beaks too far down in the feed. This results in a significant feed saving over a period of time by the reduction of the amount of feed lost when it clings to other parts of the poultry's heads beside the beak. While the trough 35 has a sufficiently wide opening 33 therein for the poultry to easily insert their heads for feeding, the width of the feeding area D is relatively narrow so that those portions of the poultry's bodies other than the beak will not be dragged through the feed to waste same.

The auger construction shown virtually eliminates feed separation that is normally associated with chain-type feeder systems. The construction also allows the poultry to be fed without the feed ever leaving the auger 30 until it is consumed by the poultry.

Since the core member 52 is unattached to at least a plurality of the flights 31, the action of feed F and the drive unit 20 on the auger 30 causes the flights 31 to be constantly moving relative to each other along the centerline of the auger. The core member, being a unitary member for a significant portion of the auger, allows the flights 31 to move with respect to it. Thus, any feed that tends to cake along on the flights 31 or core member 52 is quickly dislodged and broken up to insure free movement of the feed along the feeder-conveyor 11 and to prevent an accumulation of stale feed on the auger.

By not attaching the core member 52 to any of the flights 31, a significant reduction in manufacturing and installation cost can be realized. When this is done, the spring-type auger 30 is shipped coiled and is installed in the poultry house without the core member 52 inserted. Then the core member is inserted after installation and allowed to be free floating in the auger. Since the flights 31 define an open core larger in diameter than the core member 52, a very thin layer E of feed F as shown in FIG. 4 is formed between the inner edges of flights 31 and member 52. The layer E, like the layer B, acts as a lubricate and separates the member 52 from auger 30 so that the wear between the auger and core member is greatly reduced.

The auger 30 is operated at a sufficient r.p.m. to maintain the feeding area D along the entire length of feeder-conveyor 11. This causes an excess of feed at the end of the return run or section 50 of conveyor 11 which is dumped into catch hopper 55 to be returned to supply hopper 12 by return conveyor 15. If straight runs of the feeder-conveyor 11 are used, then the transfer conveyor (not shown) similar to conveyor 15 receives the feed from the distal end of the straight run of the feeder-conveyor 11 connected to hopper 12 and transfers this feed to the return section of the feeder-conveyor 11. Thus, it will be seen that if straight runs of feeder-conveyor 11 are used, there will be a hopper 12 for every other run of the conveyor 11 with the transfer conveyor supplying feed to those runs of the conveyor 11 not connected to hopper 12.

The second embodiment of the invention transports the material in much the same way as the first embodiment. The only difference is that the core member 52' is held stationary by bracket 116 and rod 110 while the auger 30' rotates therearound. With this embodiment of the invention, however, the auger 30' cannot be attached to the core member 52'. Thus, by maintaining the core member 52' stationary, it will be seen that an advantageous cleaning of the core member 52' and the flights 31' of auger 30' can be effected.

The third embodiment of the invention also transports the material in much the same way as the first embodiment of the invention. The only difference is that cam member 212 and rod 206 reciprocate the core member 52" within auger 30" as it is rotated longitudinally with respect to the centerline of the auger 30". FIG. 7 illustrates the core member 52" as being freely rotatable about rod 206 through bearing 204 so that core member 52" can rotate with auger 30". It is to be understood, however, that the core member 52" could be fixed with respect to rod 206 in a manner such as rod 110 is attached to core member 52' so that it would not rotate. Also, in this embodiment of the invention, core member 52" cannot be attached to auger 30". Thus, by reciprocating core member 52" in auger 30", an advantageous cleaning of the core member 52" and the flights 31" of auger 30" can be effected.

The invention disclosed herein is suitable for use in present poultry houses whether of the floor-growing type or caged type. Appropriate hanging mechanisms may be provided for selectively adjusting the feeder-conveyors 11 to the proper height in each operation. The invention is particularly adapted for use with caged poultry, especially layers, where the availability of fresh feed is critical to egg size and grade.

While specific embodiments of the invention have been disclosed herein, it is to be understood that the full use of substitutes, modifications and equivalents may be used without departing from the scope of the inventive concept.

We claim:

1. An auger construction for transporting particulate food materials including:
    an animal feed trough support means;
    an open-cored spring-type auger carried in said support means for free rotation therein; and,
    a core of a size freely receivable in the open core of said auger positioned within the open core of said auger and substantially filling same, said core being unattached to the flights of said auger so that relative nonrestrictive movement between the auger flights and core takes place as an incident to the passage of the particulate food material along said auger.

2. An auger construction as set forth in claim 1 wherein said core is flexible.

3. An auger construction as set forth in claim 1 wherein said core is substantially rigid.

4. An auger construction as set forth in claim 2 wherein said core is a synthetic material.

5. An auger construction as set forth in claim 3 wherein said core is metallic.

6. An auger construction as set forth in claim 1 further including means for preventing rotation of said core as said auger is rotated.

7. An auger construction as set forth in claim 6 further including means for reciprocating said core longitudinally within said auger as said auger is rotated.

8. An auger construction as set forth in claim 1 further including means for reciprocating said core longitudinally within said auger as said auger is rotated.

9. An auger construction as set forth in claim 1 wherein said support means defines an open top auger recess therein adapted to rotatably receive said auger and core therein and further including means for selectively rotating said auger in said trough.

10. An auger construction as set forth in claim 9 further including means for supplying particulate material to said auger and means for regulating the amount of material carried by said auger.

11. An auger construction as set forth in claim 10 further including means for selectively returning the excess material discharged from said auger to said means for supplying material to said auger.

12. An auger construction as set forth in claim 11 further including means for reciprocating said core longitudinally within said auger as said auger is rotated.

13. An auger construction as set forth in claim 12 further including means for preventing rotation of said core as said auger is rotated.

14. An auger construction as set forth in claim 13 further including means for reciprocating said core longitudinally within said auger as said auger is rotated.

15. An animal-feeding system including:
 a. at least one feeder-conveyor for distributing feed to the poultry comprising:
  1. a U-shaped elongate feed trough including a semicircular bottom section and a pair of upstanding walls integral with the edges of said bottom section defining an opening therebetween;
  2. an elongated flexible resilient open-cored spring-type auger carried within said U-shaped trough with its lower portion positioned within said bottom section of said trough, said auger having a diameter less than that of said semicircular bottom section and including a plurality of helical flights integral with each other to define said auger;
  3. a tubular cylindrical core member having a diameter slightly less then the open core of said auger within said auger with a length substantially equal to the length of said auger and not attached to said auger;
  4. a feed receptacle mounted at one end of said trough for introducing feed to said auger including an inlet and a discharge end, said discharge end including a tubular section having an inside diameter sufficient to rotatably receive one end of said auger therethrough and defining an opening along the length of the upper portion thereof, and a gate adapted to selectively close said opening; and,
  5. a drive unit carried by said feed receptacle and connected to that end of said auger extending through said tubular section for selectively rotating said auger;
 b. feed supply means for selectively supplying feed to said receptacle, and,
 c. feed return means operatively connected to the distal end of said feeder-conveyor for selectively returning the feed discharged from the distal end of said feeder-conveyor back to said feed supply means.

16. A feeding system as set forth in claim 15 further including means for reciprocating said core member longitudinally within said auger as said auger is rotated.

17. A feeding system as set forth in claim 16 further including means for preventing rotation of said core member as said auger is rotated.

18. A feeding system as set forth in claim 17 further including means for reciprocating said core member longitudinally within said auger.

* * * * *